(12) United States Patent
Hartmann et al.

(10) Patent No.: US 10,557,529 B2
(45) Date of Patent: Feb. 11, 2020

(54) TRACTION MECHANISM TENSIONING UNIT FOR A TRACTION MECHANISM

(71) Applicant: Schaeffler Technologies AG & Co. KG, Herzogenaurach (DE)

(72) Inventors: Christian Hartmann, Emskirchen (DE); Klaudyna Ostermaier, Baiersdorf (DE); Yong-Hee Kang, Weisendorf (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 53 days.

(21) Appl. No.: 15/736,930

(22) PCT Filed: Aug. 30, 2016

(86) PCT No.: PCT/DE2016/200405
§ 371 (c)(1),
(2) Date: Dec. 15, 2017

(87) PCT Pub. No.: WO2017/045681
PCT Pub. Date: Mar. 23, 2017

(65) Prior Publication Data
US 2018/0363739 A1 Dec. 20, 2018

(30) Foreign Application Priority Data
Sep. 15, 2015 (DE) .......... 10 2015 217 592

(51) Int. Cl.
*F16H 7/08* (2006.01)
(52) U.S. Cl.
CPC ....... *F16H 7/08* (2013.01); *F16H 2007/0812* (2013.01); *F16H 2007/0814* (2013.01);
(Continued)

(58) Field of Classification Search
CPC ........ F16H 7/08; F16H 7/0848; F16H 7/0829; F16H 2007/0802; F16H 2007/0812;
(Continued)

(56) References Cited

U.S. PATENT DOCUMENTS

| 4,674,996 A | 6/1987 | Anno et al. | |
|---|---|---|---|
| 2003/0070717 A1* | 4/2003 | Hashimoto | ........... F16H 7/0848 137/825 |

(Continued)

FOREIGN PATENT DOCUMENTS

| DE | 2008472 | 9/1971 |
|---|---|---|
| DE | 3609233 | 10/1986 |

(Continued)

OTHER PUBLICATIONS

DE3824555(C1) Translation; Doll et al; Hydraulic Chain Tensioner for an Internal Combustion Engine; Jun. 7, 1989; Espacenet (Year : 1989).*

*Primary Examiner* — Michael R Mansen
*Assistant Examiner* — Raveen J Dias
(74) *Attorney, Agent, or Firm* — Volpe and Koenig, P.C.

(57) ABSTRACT

A traction mechanism tensioning unit (1) for a traction mechanism drive of a motor vehicle is provided. The traction mechanism tensioning unit (1) includes a housing (2) in which a hydraulic tensioner (3) is arranged, the hydraulic tensioner (3) has a cylinder element (4) connected rigidly to the housing (2), in which an axially moving piston (5) is arranged, a compression spring (18) is arranged for generating an axial tensioning force on the piston (5) in a compression chamber (6) formed between the cylinder element (4) and the piston (5), and the hydraulic tensioner (3) is fluidly connected to a pressurized medium supply line (8)
(Continued)

via a pressure control valve (7) arranged in the housing (2) for realizing a constant pressurized medium pressure in the compression chamber (6).

7 Claims, 2 Drawing Sheets

(52) U.S. Cl.
CPC ................ *F16H 2007/0859* (2013.01); *F16H 2007/0891* (2013.01)

(58) Field of Classification Search
CPC ..... F16H 2007/1814; F16H 2007/0817; F16H 2007/0859; F16H 2007/0891
USPC .......................................................... 474/110
See application file for complete search history.

(56) References Cited

U.S. PATENT DOCUMENTS

| | | | |
|---|---|---|---|
| 2008/0119309 A1* | 5/2008 | Kern | F16H 7/0836 474/109 |
| 2009/0170647 A1* | 7/2009 | Mishima | F16H 7/0848 474/110 |
| 2009/0197721 A1 | 8/2009 | Emizu et al. | |
| 2010/0093473 A1* | 4/2010 | Bulloch | F16H 7/0836 474/104 |
| 2011/0237370 A1* | 9/2011 | Hartmann | F16H 7/0836 474/110 |
| 2011/0256970 A1* | 10/2011 | Nakano | F16H 7/0836 474/110 |
| 2012/0252615 A1* | 10/2012 | Konuma | F16H 7/0848 474/110 |
| 2015/0024886 A1* | 1/2015 | Chekansky | F16H 7/0836 474/101 |
| 2015/0024887 A1 | 1/2015 | Oh et al. | |
| 2015/0240918 A1* | 8/2015 | Emizu | F01L 1/024 474/110 |
| 2018/0066732 A1* | 3/2018 | Michel | F16H 7/08 |

FOREIGN PATENT DOCUMENTS

| | | |
|---|---|---|
| DE | 3824555 | 7/1989 |
| DE | 102008059212 | 8/2009 |
| DE | 102012223329 | 2/2014 |
| DE | 102014200950 | 7/2015 |

\* cited by examiner

TRACTION MECHANISM TENSIONING UNIT FOR A TRACTION MECHANISM

BACKGROUND

The invention relates to a hydraulic traction mechanism tensioning unit for a traction mechanism drive of a motor vehicle.

It is generally known that traction mechanism tensioning units are mainly used for compensating for production tolerances, traction mechanism elongation, and wear. Here, a tensioning effect is realized by the traction mechanism tensioning unit that acts, via a tensioning rail, on the traction mechanism, usually a chain or a belt.

From DE 10 2012 223 329 A1, a hydraulic traction mechanism tensioning unit is disclosed. This unit comprises a tensioner housing with a cylinder, a piston that is guided so it can move longitudinally and defines, with the cylinder, a hydraulic compression chamber, a hydraulic supply space defined by the tensioner housing and by the cylinder and a non-return valve that connects the supply space to the compression chamber. The non-return valve closes when the pressure in the compression chamber exceeds the pressure in the supply space. The traction mechanism tensioning unit also comprises a pressure relief valve that connects the compression chamber to the supply space, wherein the pressure relief valve opens when the pressure in the compression chamber exceeds a specified limit pressure. In addition, the traction mechanism tensioning unit comprises a control valve that can be switched between an open and a closed position and, in the open position, permits flow via the pressure relief valve and, in the closed position, prevents flow via the pressure relief valve.

SUMMARY

The objective of the present invention lies in refining a traction mechanism tensioning unit and, in particular, reducing the wear of the traction mechanism drives and also the friction on the traction mechanism drive.

The traction mechanism tensioning unit according to the invention comprises a housing in which a hydraulic tensioner is arranged, wherein the hydraulic tensioner has a cylinder element that is arranged in the housing and in which there is a piston that moves axially, wherein a compression spring is arranged for generating an axial tensioning force on the piston in a compression chamber formed between the cylinder element and the piston, wherein the hydraulic tensioner is fluidly connected to a pressurized medium supply line via a pressure control valve arranged in the housing for realizing a constant oil pressure in the compression chamber, wherein the pressure control valve has a valve housing in which there is a valve piston that can move axially and is loaded by a valve spring and wherein a second valve piston chamber is constructed between the hydraulic tensioner and the valve piston, wherein a pressure increase in the second valve piston chamber leads to an axial displacement of the valve piston against a spring force of the valve spring. The valve housing has at least one cut-out on a peripheral surface that interacts with at least one cut-out on a peripheral surface of the valve piston for the variable setting of an oil flow rate.

For supplying oil to the traction mechanism tensioning unit and thus also for the axial adjustment of the piston of the hydraulic tensioner, motor oil is used. Consequently, the oil pressure in the compression chamber of the hydraulic tensioner is dependent on the pressure of the motor oil that is subjected to strong fluctuations according to the rotational speed and temperature of the motor. The pressure control valve is provided for regulating the oil pressure in the compression chamber of the hydraulic tensioner and especially for realizing a constant oil pressure. In other words, the pressure control valve keeps the pressure in the compression chamber constant automatically and without additional controls. The pressure control valve is connected upstream of the hydraulic tensioner and is arranged directly on the pressurized medium supply line. Consequently, the pressure control valve separates the hydraulic tensioner from the pressurized medium supply line.

The pressure control valve has a valve housing in which a valve piston loaded by a valve spring is arranged so that it can move axially. In other words, the pressure control valve preferably is formed of three elements, namely the valve housing, the valve spring, and the valve piston. The valve spring here forms a contact axially between the valve housing and the valve piston and pretensions the valve piston. The valve housing and the valve piston are constructed from one sheet-metal material. The valve spring is constructed as a compression spring.

A second valve piston chamber is constructed between the hydraulic tensioner and the valve piston, wherein a pressure increase in the second valve piston chamber leads to an axial displacement of the valve piston against a spring force of the valve spring. The valve piston thus forms the two valve piston chambers in the valve housing. By pretensioning the valve spring, the supply pressure of the hydraulic tensioners is fixed. The supply pressure of the hydraulic tensioner is preferably 0.1 bar to 5 bar. If the oil pressure of the motor exceeds this preset pressure, the valve piston reduces the volumetric flow of the motor oil through axial displacement until the preset pressure is reached. Furthermore, pressure spikes from the hydraulic tensioner, produced as a consequence of an open non-return valve, are eliminated by the pressure control valve.

The valve housing has, on a peripheral surface, at least one cut-out that interacts with at least one cut-out on a peripheral surface of the valve piston for the variable setting of a flow rate of an oil. Preferably, both on the peripheral surface of the valve housing and also on the peripheral surface of the valve piston, multiple tangentially adjacent cut-outs are constructed. In particular, between one to fifteen cut-outs are provided. Furthermore, the at least one cut-out on the valve housing and/or the at least one cut-out on the valve piston preferably have different geometries. For example, the at least one cut-out can have a round, oval, polygonal, or elongated construction. Via the respective cut-outs, the oil flows out from the pressurized medium supply line into the pressure control valve and from there out via a non-return valve into the hydraulic tensioner. An effective flow cross section at the respective cut-outs is variably adjustable as a function of the axial position of the valve piston relative to the valve housing. Consequently, the flow rate of the oil is dependent on the axial position of the valve piston in the valve housing. A displacement of the valve piston against the spring force of the valve spring reduces the maximum flow rate of the oil until the oil supply is closed.

Preferably, the pressure control valve is arranged in a hole provided for it in the housing and forms an axial contact on the hydraulic tensioner. In particular, the pressure control valve is arranged coaxial to the hydraulic tensioner. Furthermore, the pressure control valve is pressed in the housing and is thus locked in rotation and fixed axially in the housing. Furthermore, the pressure control valve forms a unit that can be retrofit and is independent of the hydraulic tensioner. This simplifies, in particular, the maintenance and assembly of the traction mechanism tensioning unit. Furthermore, retrofitting the pressure control valve is not problematic, because only minimal processing of the housing is required for accommodating the pressure control valve.

According to one embodiment, the pressure control valve has a threaded element in which a valve spring is held at least partially, wherein this valve spring axially pretensions a valve piston against the housing. Thus, the pressure control valve preferably is formed of three elements, namely the threaded element, the valve spring, and the valve piston. The valve spring here forms an axial contact between the threaded element and the valve piston and pretensions the valve piston. The valve piston is constructed from a sheet metal material, wherein the valve spring is constructed as a compression spring. Furthermore, the threaded element is screwed directly in the housing. This embodiment enables an especially simple replacement of the pressure control valve.

The valve housing preferably has a first recess on a first end face that is provided for the fluid connection to the hydraulic tensioner. The oil flows out from the pressure control valve through the first recess into the hydraulic tensioner.

In a further preferred way, the valve housing has a second recess on a second end face that is provided for venting a first valve piston chamber. The traction mechanism is thus pretensioned by the traction mechanism tensioning unit according to the invention uniformly over the motor rotational speed, whereby a reduction of friction between the tensioning rail and the traction mechanism is realized.

BRIEF DESCRIPTION OF THE DRAWINGS

Other measures improving the invention are described in more detail below together with the description of a preferred embodiment of the invention using the figures. Shown are.

DETAILED DESCRIPTION

Figure 1:
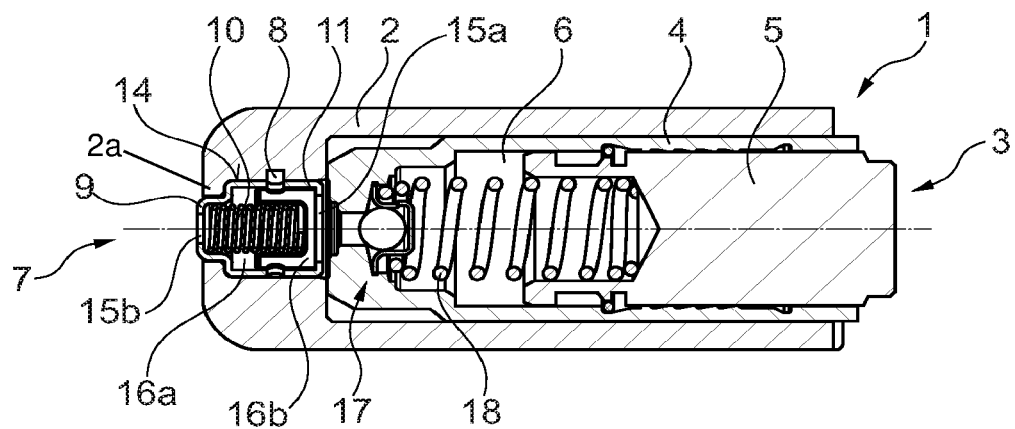
FIG. 1 a schematic section diagram for illustrating the configuration of a traction mechanism tensioning unit according to the invention, FIG. 2 a perspective partial section diagram for illustrating the configuration of the traction mechanism tensioning unit according to the invention according to FIG. 1, FIG. 3 a perspective partial section diagram for illustrating the configuration of a pressure control valve according to the invention according to FIG. 1, FIG. 4 a schematic section diagram for illustrating the configuration of the pressure control valve according to the invention according to FIG. 1, and FIG. 5 a schematic section diagram for illustrating the configuration of a partially illustrated traction mechanism tensioning unit according to the invention.

According to FIG. 1, a traction mechanism tensioning unit 1 according to the invention for a traction mechanism drive of a motor vehicle—not shown here—has a housing 2 in which a hydraulic tensioner 3 is arranged. The hydraulic tensioner 3 has a cylinder element 4 that is connected rigidly to the housing 2 and in which an axially moving piston 5 is arranged. In a compression chamber 6 formed between the cylinder element 4 and the piston 5 there is a compression spring 18 for generating an axial tensioning force on the piston 5. Furthermore, the piston 5 can be loaded by a non-return valve 17 with a fluid—not shown here. The piston 5 contacts a tensioning rail—not shown here—which is provided for keeping a traction mechanism under tension.

The hydraulic tensioner 3 is fluidly connected to a pressurized medium supply line 8 via a pressure control valve 7 arranged in the housing 2 for realizing a constant oil pressure in the compression chamber 6. The pressure control valve 7 has a valve housing 9 in which a valve piston 11 loaded by a valve spring 10 is arranged so that it can move axially. The valve housing 9 has a first recess 15a on a first end face that is provided for the fluid connection between the pressure control valve 7 and the hydraulic tensioner 3. Furthermore, the valve housing 9 has a second recess 15b that is arranged on a second end face and is provided for venting a first valve piston chamber 16a. A second valve piston chamber 16b is formed between the valve piston 11 and the hydraulic tensioner 3.

Figure 2:
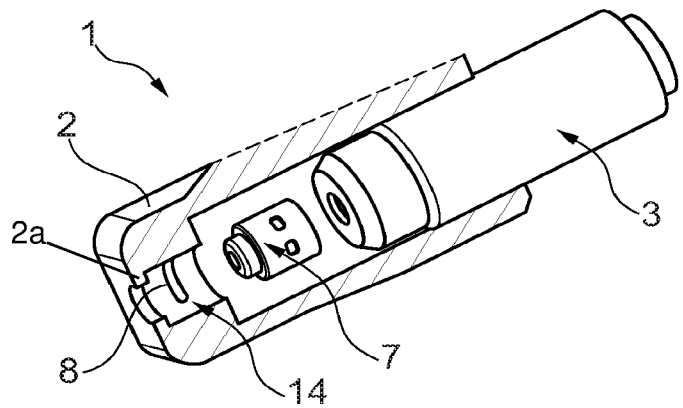

According to FIG. 2, the pressure control valve 7 is arranged coaxial to the hydraulic tensioner 3 in the housing 2. Due to the exploded view representation of the traction mechanism tensioning unit 1, the pressurized medium supply line 8 with a longitudinal construction in the peripheral direction is visible in the housing 2. The pressure control valve 7 forms a contact in a hole 14 provided for it in the housing 2. As shown in FIG. 1, the housing 2 includes a radially inwardly extending flange 2a that provides an axial abutment for the pressure control valve 7. Consequently, for assembling the traction mechanism tensioning unit 1, initially the pressure control valve 7 is pressed into the hole 14 provided for it in the housing 2. The hydraulic tensioner 3 is then preferably pressed into the housing 2.

Figure 3:
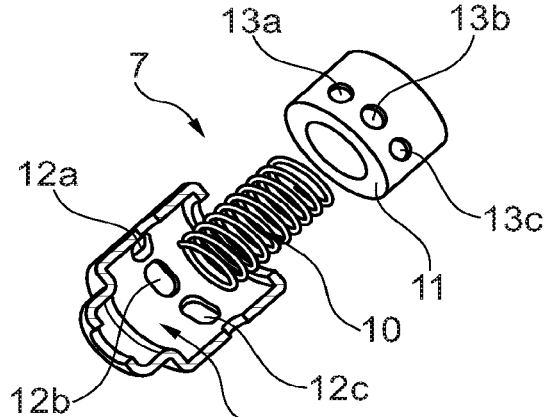

According to FIG. 3, the pressure control valve 7 is made merely from the valve housing 9, the valve spring 10, and the valve piston 11. The valve housing 9 is shown in section and has, on one peripheral surface, multiple cut-outs 12a-12c that are distributed across the periphery and interact with multiple cut-outs 13a-13c distributed across the periphery on a peripheral surface of the valve piston 11 for the variable setting of a flow rate of a motor oil—not shown here. The valve housing 9 and the valve piston 11 are formed from a sheet metal material, wherein the cut-outs 12a-12c are preferably formed by stamping.

Figure 4:
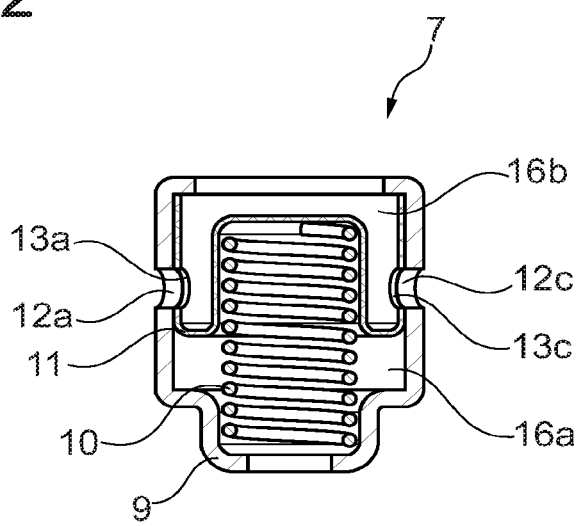

According to FIG. 4, the valve piston 11 is pretensioned in a starting position by the valve spring 10 axially against the valve housing 9. The valve spring 10 here forms a contact axially between the valve piston 11 and the valve housing 9. In this starting position, the cut-outs 12a, 12c on the valve housing 9 align completely with the cut-outs 13a, 13c on the valve piston 11. In other words, in the starting position of the valve piston 11, a maximum flow rate is realized. The valve piston 11 forms the first and second valve piston chamber 16a, 16b, wherein the valve spring 10 is arranged in the first valve piston chamber 16a. If the pressure increases in the second valve piston chamber 16b, the valve piston 11 moves against the spring force of the valve spring 10, wherein the effective cross-sectional area of the cut-outs 12a, 12c, and 13a, 13c becomes smaller, and wherein the effective cross-sectional area of the cut-outs 12a, 12c, and 13a, 13c reaches a minimum for a maximum pressure in the second valve piston chamber 16b. Thus, the maximum flow rate decreases, whereby the pressure increase in the second valve piston chamber 16b is decreased again.

Figure 5:
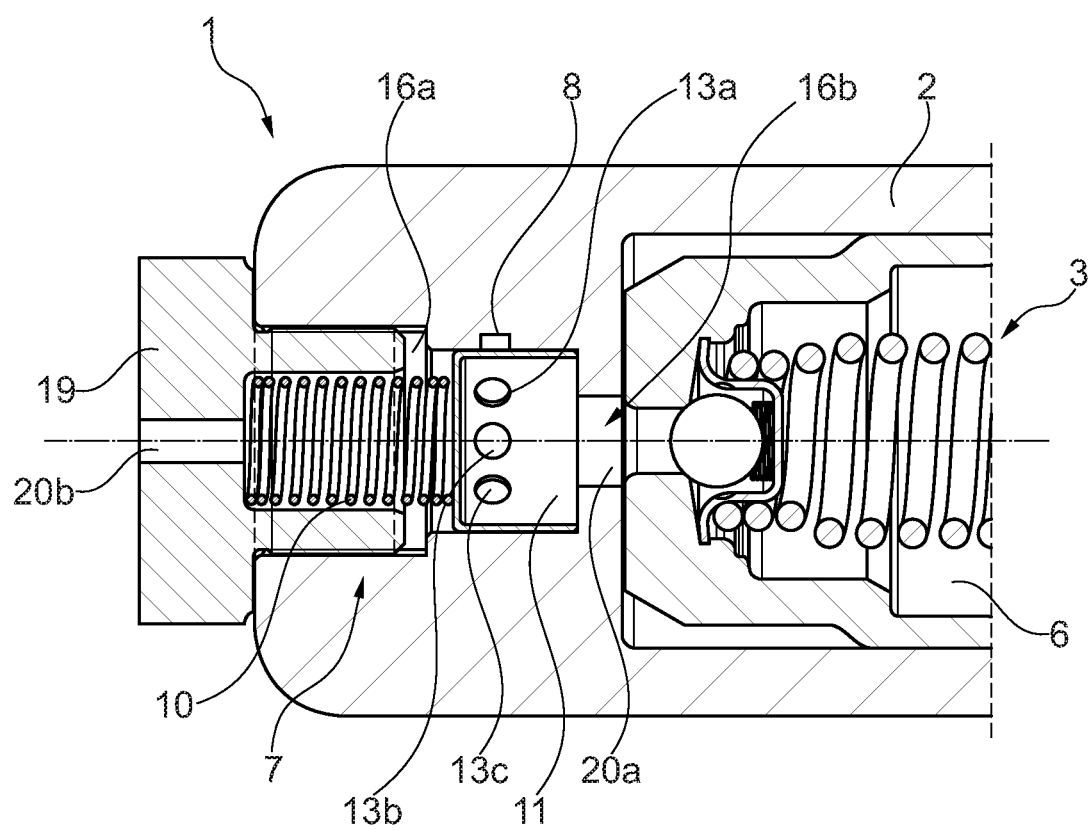

According to FIG. 5, a traction mechanism tensioning unit 1 according to the invention for a traction mechanism drive of a motor vehicle—not shown here—has a housing 2, in which a hydraulic tensioner 3 is arranged. The hydraulic tensioner 3 is fluidly connected to a pressurized medium supply line 8 via a pressure control valve 7 arranged in the housing 2 for realizing a constant oil pressure in a compression chamber 6. The pressure control valve 7 has a threaded element 19 that is screwed axially in the housing 2 and in which at least partially a valve spring 10 is held that pretensions a valve piston 11 axially against the housing 2. The housing 2 has a first recess 20a that is provided for the fluid connection between the pressure control valve 7 and the hydraulic tensioner 3. Furthermore, the threaded element 19 has a second recess 20b that is provided for venting a first valve piston chamber 16a. A second valve piston chamber 16b is formed between the valve piston 11 and the hydraulic tensioner 3. The pressurized medium supply line 8 interacts with multiple cut-outs 13a-13c distributed over the periphery on a peripheral surface of the valve piston 11 for the variable setting of a flow rate of a motor oil—not shown here. For this purpose, the valve piston 11 is arranged so that it moves axially in the housing 2. The effect of the pressure control valve 7 corresponds to the effect of the pressure control valve 7 shown in FIG. 4.

LIST OF REFERENCE SYMBOLS

1 Traction mechanism tensioning unit
2 Housing
3 Hydraulic tensioner
4 Cylinder element
5 Piston
6 Compression chamber
7 Pressure control valve
8 Pressurized medium supply line
9 Valve housing
10 Valve spring
11 Valve piston
12a-12c Cut-out in the valve housing
13a-13c Cut-out in the valve piston
14 Hole
15a, 15b Recess
16a, 16b Valve piston chamber
17 Non-return valve
18 Compression spring
19 Threaded element
20a, 20b Recess

The invention claimed is:

1. A traction mechanism tensioning unit for a traction mechanism drive of a motor vehicle, the traction mechanism tensioning unit comprising:
 a housing,
 a hydraulic tensioner arranged in the housing, the hydraulic tensioner including a cylinder element arranged in the housing and an axially moving piston arranged in the cylinder element,
 a compression spring that generates an axial tensioning force on the piston arranged in a compression chamber formed between the cylinder element and the piston,
 a pressure control valve arranged in a hole in the housing and oriented along a common longitudinal axis as the housing, such that a radially inwardly extending flange defined on the housing provides an axial abutment surface for the pressure control valve,
  the pressure control valve providing a constant pressurized medium pressure in the compression chamber that connects the hydraulic tensioner to a pressurized medium supply line, the pressure control valve including a valve housing, in which a valve piston loaded by a valve spring is axially movable and a second valve piston chamber formed between the hydraulic tensioner and the valve piston,
 wherein a pressure increase in the second valve piston chamber leads to an axial displacement of the valve piston against a spring force of the valve spring, and
 the valve housing has, on a peripheral surface, at least one cut-out that interacts with at least one cut-out on a peripheral surface of the valve piston for variable setting of a flow rate of the pressurized medium.

2. The traction mechanism tensioning unit according to claim 1, wherein the pressure control valve has a threaded element in which the valve spring that pre-tensions the valve piston against the housing is held at least partially.

3. The traction mechanism tensioning unit according to claim 1, wherein the valve housing has, on the peripheral surface, a plurality of the cut-outs that interact with a plurality of the cut-outs on the peripheral surface of the valve piston for the variable setting of the pressurized medium flow rate.

4. The traction mechanism tensioning unit according to claim 1, wherein the valve housing has a first recess on a first end face that is provided for fluid connection to the hydraulic tensioner.

5. The traction mechanism tensioning unit according to claim 1, wherein the valve housing has a second recess on a second end face that is provided for venting a first valve piston chamber.

6. The traction mechanism tensioning unit according to claim 1, wherein the pressure control valve is arranged coaxial to the hydraulic tensioner.

7. The traction mechanism tensioning unit according to claim 1, wherein the valve housing and the valve piston are constructed from sheet-metal.

* * * * *